United States Patent Office 3,128,421
Patented Apr. 7, 1964

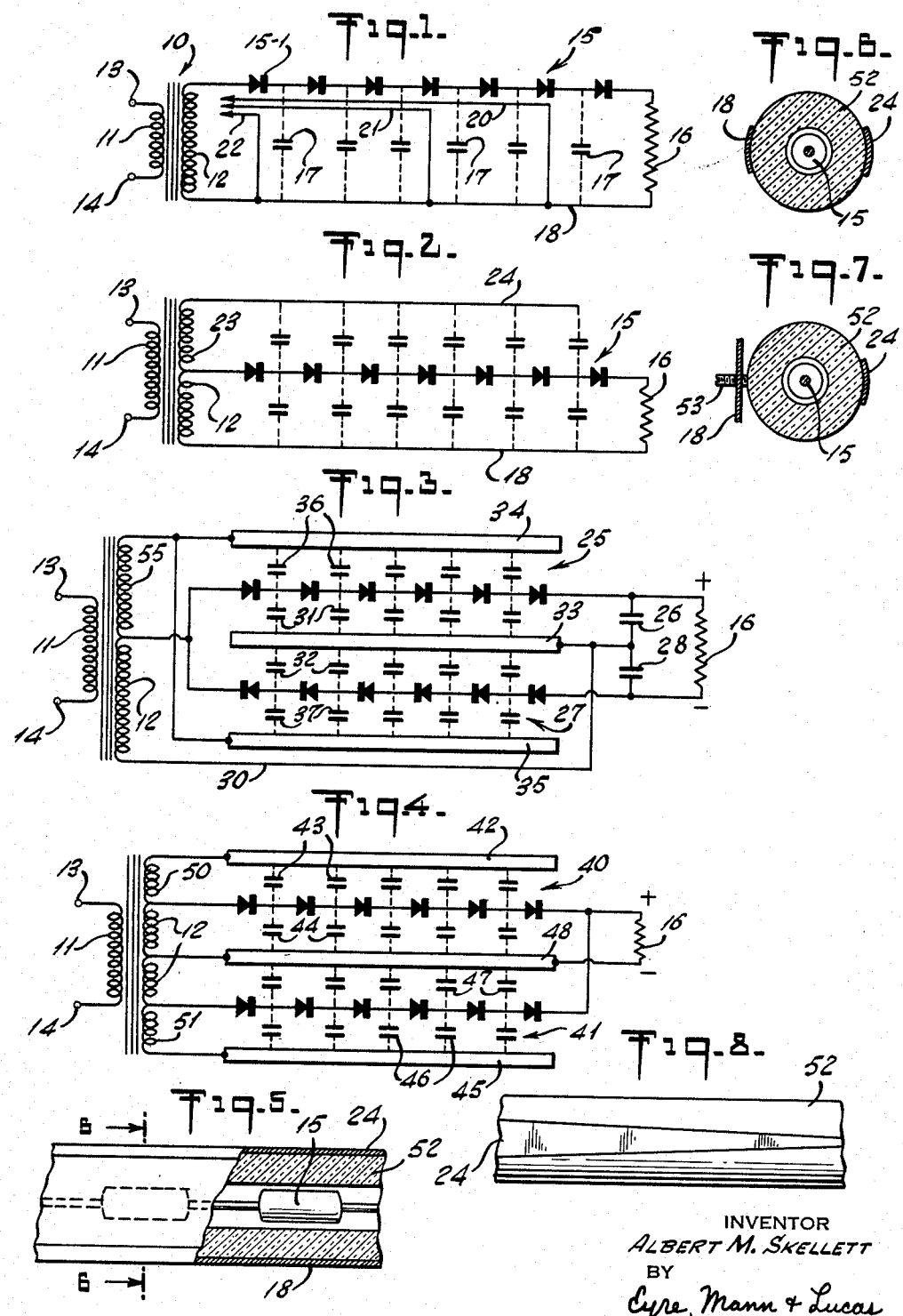

3,128,421
SERIES RECTIFIER CIRCUIT WITH CAPACITY COMPENSATING MEANS
Albert M. Skellett, Madison, N.J., assignor to Tung-Sol Electric Inc., a corporation of Delaware
Filed May 19, 1961, Ser. No. 111,209
10 Claims. (Cl. 321—11)

This invention relates to a high voltage rectifier which converts alternating current to direct current and includes a plurality of rectifier components connected in series for passing current in one direction but blocking current in the other direction. The invention has specific reference to a means for compensating for the distributed capacity normally present in all such rectifier arrangements so that the voltage distribution across the rectifier components is both equalized and reduced.

When high voltage rectifier circuits are assembled there is always some distributed capacity between the rectifier components and the other side of the high voltage system. These distributed capacities are of no consequence when the rectifier components are passing current in the forward direction to the load terminals. During this part of the alternating current wave, the voltage drop across the rectifier components is quite low, of the order of a few volts, and there is no voltage problem. During the other half of the wave, when voltages are impressed on the rectifier components in a reverse direction, there are small capacity currents passing through the rectifiers due to the capacity of the rectifier electrodes. Since some of the rectifier components are closer to the power supply, the capacity currents are greater through these components than through the components close to the load and for this reason the reverse voltages across the components will vary considerably, causing the components close to the power supply to receive the higher inverse voltages and thereby produce a tendency to fail.

The present invention produces a compensating circuit for applying additional distributed capacities which balance the normal capacities already present in the circuit. With the added capacities the inverse voltages are not only equalized but the inverse currents are substantially reduced, thereby eliminating failure during the inverse voltage cycle.

One of the objects of this invention is to provide a compensating circuit for a high voltage rectifier arrangement which avoids one or more of the disadvantages and limitations of prior art arrangements.

Another object of the invention is to protect rectifier components from voltage failure during the application of inverse voltage pulses.

Another object of the invention is to equalize the inverse voltages applied to a series array of rectifier components.

Another object of the invention is to reduce substantially the inverse voltages applied to rectifier components in a series rectifier circuit.

Another object is to enable the use of rectifier units with lower peak inverse voltage ratings.

Another object of the invention is to reduce the number of rectifier components necessary in a rectifier circuit.

The invention comprises a capacity compensating circuit which can be applied to a series rectifier circuit and comprises a source of alternating current power, a series of rectifier components for passing currents in one direction only, and an additional electrode positioned adjacent to the rectifier components for creating distributed capacities to the components. The additional electrode is supplied with a voltage which is approximately twice the voltage applied to the components. The result is a compensating circuit which tends to cancel the capacity currents during the application of voltage pulses in an inverse direction. The compensation system may be applied to half-wave rectifiers, full-wave rectifiers, and voltage doubler circuits.

For a better understanding of the present invention, together with other and further objects thereof, reference is made to the following description taken in connection with the accompanying drawings.

FIG. 1 is a schematic diagram of connections of a half wave rectifier showing how the capacity currents add to produce unequal inverse voltages across the rectifier components.

FIG. 2 is a schematic diagram of connections showing one form of the compensating circuit for reducing the capacity currents and equalizing the inverse voltages across the rectifier components.

FIG. 3 is a schematic diagram of connections of a voltage doubler circuit with the compensating electrodes applied to both rectifier stacks.

FIG. 4 is a schematic diagram of connections of a full-wave rectifier with the compensating means applied as before.

FIG. 5 is a partial cross sectional view showing an insulating tube for supporting the rectifier components and for applying compensating electrodes for equalizing and reducing capacity currents.

FIG. 6 is a cross sectional view of the insulating tube shown in FIG. 5 and is taken along line 6—6 of that figure.

FIG. 7 is a cross sectional view similar to FIG. 6 but showing an adjusting means associated with one of the compensating electrodes.

FIG. 8 is a side view of an insulating tube similar to that shown in FIG. 5 but supporting an electrode which is tapered along the length of the tube.

Referring now to FIG. 1, a rectifier circuit is shown which includes a step-up transformer 10 having a primary winding 11 and a high voltage secondary winding 12. The primary winding is connected to terminals 13 and 14 which are for connection to a source of alternating current power. The ends of the secondary winding are connected to a series of rectifier components 15 in series with a load 16. This figure shows the distributed capacities 17 which are always present in a circuit of this type because of the fact that the return conductor 18 must be mounted in some position adjacent to the rectifiers 15. The distributed capacities 17 are not always of equal value but when the voltage is in the inverse direction small capacity currents pass through these capacities and through the rectifier electrode capacity to the other side of the transformer winding. In FIG. 1 three of these capacity currents are indicated by lines 20, 21, and 22 and it is obvious that the rectifier components close to the load 16 pass currents of small value while the rectifier component adjacent to the winding 12 passes all three currents indicated. Because of this addition of currents, the voltage across the rectifier 15–1 has a much larger inverse voltage impressed across it than any of the other components in the series and therefore this component is liable to fail.

Referring now to FIG. 2, the same circuit is shown having a secondary winding 12, a series of rectifier components 15, and a load 16. In this figure an additional secondary winding 23 has been added and the outer end of this winding is connected to a conductor 24 which is placed along the line of rectifier components in a position which will approximate the distributed capacities created by conductor 18. If the two conductors 18 and 24 are positioned the same distance from the rectifier array their distributed capacities will be equal and since the voltage on conductor 24 is twice that of the rectifier components, a series of voltage dividers is formed which maintain the rectifier components at the same potential as the mid-point connection between windings 12 and 23. If the capacities are balanced exactly there will be no tendency for any capacity currents to flow when inverse voltage pulses are applied to the components and this lack of inverse voltage means that fewer rectifier components need be used and failure due to the application of inverse voltages is prevented.

The rectifier circuit shown in FIG. 3 is a voltage doubler and includes a first series assembly of rectifier components 25, arranged to send a positive voltage to the upper end of the load 16, and to charge capacitor 26 to the approximate voltage provided by the secondary winding 12. A second series assembly of rectifier components 27 is connected between the same side of winding 12 and the other side of the load. This series passes current during the opposite half of the wave and charges capacitor 28 in a direction which adds its potential to capacitor 26 and thereby provides approximately twice the voltage of the winding 12 across the load 16. The lower end of winding 12 is connected to a conductor 30 which is connected to the mid-point between capacitors 26 and 28. This conductor is often grounded and, even when not grounded, it represents a conductive region which provides small distributed capacities to both rectifier assemblies. These distributed capacities are represented by capacitors 31 and 32 connected by dotted lines between an extension 33 of conductor 30 and the two rectifier arrays 25 and 27. In order to equalize and compensate for the distributed capacities, electrodes 34 and 35 are added to the system in a manner which will be described later. When installed, electrodes 34 and 35 produce distributed capacities 36 and 37 between the two electrodes and the two rectifier assemblies 25 and 27.

Secondary winding 12 produces a definite alternating current voltage of a particular value and this voltage is applied to capacitors 26 and 28, thereby producing twice the voltage across the load 16. Electrode 35 is connected to the end terminal of the auxiliary winding 55 and is thereby maintained at a voltage which is approximately twice the value of the voltage existing between electrode 33 and components 27. It is evident that the assembly of rectifier components 27 is half way between the voltage of electrode 33 and electrode 35 and in like manner the voltages of components 25 are half way between electrodes 34 and 33. This arrangement compensates for the distributed capacities 31 and 32 by providing similar capacities 36 and 37 at twice the voltage to compensate for the capacitor voltages and to eliminate the capacitor currents.

The circuit shown in FIG. 4 includes a similar input transformer 11, 12 which in this case is tapped in the middle and has two auxiliary end windings 50 and 51. The mid-point is connected to one terminal of the load 16, the other terminal being connected to two rectifier assemblies 40 and 41 which have their load terminals connected together and to one side of load 16. The other ends of the rectifiers are connected to opposite ends of secondary winding 12 and both pass current in the same direction making one terminal of load 16 positive, and the other terminal negative. This type of rectifier is termed a full-wave rectifier and requires no added capacitors across the load. In order to compensate for the inverse capacitor currents, an electrode 42 is placed adjacent to the string of rectifier components 40 and provides distributed capacities between the electrode and all the rectifier units. These distributed capacities 43 act as one arm of a bridge or voltage divider and compensate for the distributed capacities 44 which are always present in a device of this kind. In a similar manner, electrode 45 is placed adjacent to rectifier components 41 and provides distributed capacities 46 which compensate for the capacities 47 which are always present between the second rectifier stack and the common electrode 48.

The operation of the circuit shown in FIG. 4 is substantially the same as shown and described in circuits of FIGS. 2 and 3. Each rectifier stack 40 and 41 is electrically positioned between electrodes 42 and 48 (for the upper stack 40) and between electrodes 45 and 48 (for the lower stack 41). It will be obvious from the above description that this arrangement of distributed capacities compensates for the capacitor currents during the application of the inverse voltage pulses. In order to apply the correct voltages to electrodes 42 and 45, auxiliary windings 50 and 51 are provided on the power transformer. These electrodes then receive twice the voltage of the rectifier stacks and, as a result, no capacity currents flow through the rectifiers during the application of the inverse voltage waves.

One convenient arrangement for supporting the series of rectifiers and for providing the distributed capacities of the system of FIG. 2 is shown in FIGS. 5 and 6, where a Lucite insulator 52 contains the rectifiers 15 in its axial space. One of the electrodes 24 is secured to one side of the outside surface of the tube and the other electrode 18 is secured to the other side. In this manner the rectifiers can be conveniently supported and the distributed capacities balanced with reasonable accuracy. Two such arrays are used for the voltage doubler circuit shown in FIG. 3 and the full-wave rectifier shown in FIG. 4. It is obvious that any good insulator material having a fairly low dielectric constant may be used instead of Lucite.

There may be arrangements where the capacities between the rectifiers and the electrodes should be varied. One such arrangement is shown in FIG. 7 where the electrode 18 is controlled in its facing by means of a small set screw 53. Various other mechanical arrangements will be self-evident.

FIG. 8 is a side view of the same kind of container shown in FIG. 5 except that one of the electrodes is tapered along the length of the tube to compensate for the presence of large grounded transformer cases and metallic containers which influence the distributed capacities between this electrode and the rectifier components.

From the above description and drawing it will be evident that the invention not only provides an arrangement of distributed capacities to compensate for the normal distributed capacities but also substantially eliminates all the inverse capacitor currents, thereby increasing the allowable inverse voltage and substantially raising the allowable output voltage for a given number of rectifier components.

The foregoing disclosure and drawings are merely illustrative of the principles of this invention and are not to be interpreted in a limiting sense. The only limitations are to be determined from the scope of the appended claims.

I claim:

1. In a high voltage rectifier circuit having a plurality of rectifier components between an alternating current power source and a load, a compensation means comprising, a first conductor positioned adjacent to each of said rectifier components for creating distributed capacities between the conductor and each component, said capacities matching the distributed capacities between the components and a second conductor connected to the power supply, said first conductor connected to the rectifier circuit so as to receive substantially twice the voltage that is applied between the rectifier components and the second conductor and thereby eliminate the capacity currents through the rectifiers during the application of the inverse voltage pulses.

2. In a high voltage rectifier circuit having a plurality of rectifier components connected between a source of alternating current power and a load, a compensation means comprising, a conductor positioned adjacent to each of said rectifier components for creating distributed capacities between the conductor and each component, said capacities adjusted so as to match the distributed capacities between the components and that portion of the circuit which normally causes unequal capacity currents through the rectifiers in the reverse direction, said conductor connected to the rectifier circuit so as to receive substantially twice the voltage that is applied between the rectifier components and said circuit portion and thereby eliminate the capacity currents through the rectifiers during the application of the inverse voltage pulses.

3. In a high voltage rectifier circuit having a plurality of rectifier components connected between the secondary of a transformer and a load, a compensation means comprising, a conductor positioned adjacent to each of said rectifier components for creating distributed capacities adjusted so as to match the distributed capacities between the components and that portion of the circuit which normally causes unequal capacity currents through the rectifiers in the reverse direction, said conductor connected to a transformer winding which applies substantially twice the voltage that is applied between the rectifier components and said circuit portion and thereby eliminate the capacity currents through the rectifiers during the application of the inverse voltage pulses.

4. A compensation means as claimed in claim 3 wherein said rectifier components are supported within an insulated tube and said conductors are secured to the outside surface of the tube.

5. A compensation means as claimed in claim 3 wherein said rectifier components are solid state junction diodes and are supported within an insulated tube, the compensating conductor is secured to one side of the tube along a line parallel to the tube axis, and a second conductor is secured to the opposite side of the tube along a line parallel to the tube axis, said second conductor connected to said circuit portion.

6. In a high voltage full-wave rectifier circuit having a plurality of rectifier components arranged in two stacks and connected between a transformer and a load, a compensation means comprising, two conductors, one for each stack, positioned adjacent to said rectifier components for creating distributed capacities between the conductors and their adjacent components, said capacities adjusted so as to match the distributed capacities between the components and that portion of the circuit which normally causes unequal capacity currents to flow through the rectifiers in a direction opposite to the normal current flow, said conductors connected to portions of the transformer so as to receive substantially twice the voltage that is applied between the rectifier components and said circuit portion and thereby eliminate the capacity currents through the rectifiers during the application of the inverse voltage pulses.

7. A compensation means as claimed in claim 6 wherein said rectifier components are equally spaced between said two conductors.

8. In a voltage doubler rectifier circuit having a plurality of rectifier components arranged in two stacks and connected between one side of a transformer winding and a load, a compensation means comprising, two compensating conductors, one for each stack, positioned adjacent to said rectifier components for creating distributed capacities between the conductors and their adjacent components, said capacities adjusted so as to match the distributed capacities between the components and a third conductor connected to the other side of the transformer winding which creates distributed capacities between the components and said third conductor, said compensating conductors each connected to a portion of the transformer so as to receive substantially twice the voltage that is applied between the rectifier components and said third conductor and thereby eliminate the capacity currents through the rectifiers during the application of the inverse voltage pulses.

9. A compensation means as claimed in claim 8 wherein said compensating conductors and said third conductor are spaced equidistant from said rectifier components.

10. A compensation means as claimed in claim 9 wherein said two rectifier stacks are each supported within an insulated tube, said compensating conductors are each secured respectively to the outside surfaces of said tubes, and a portion of said third conductor is secured to each of said tubes in opposite alignment to the compensating conductors.

References Cited in the file of this patent

UNITED STATES PATENTS

| | | |
|---|---|---|
| 1,842,716 | De Ferranti | Jan. 26, 1932 |
| 2,875,394 | Cleland | Feb. 24, 1959 |